UNITED STATES PATENT OFFICE.

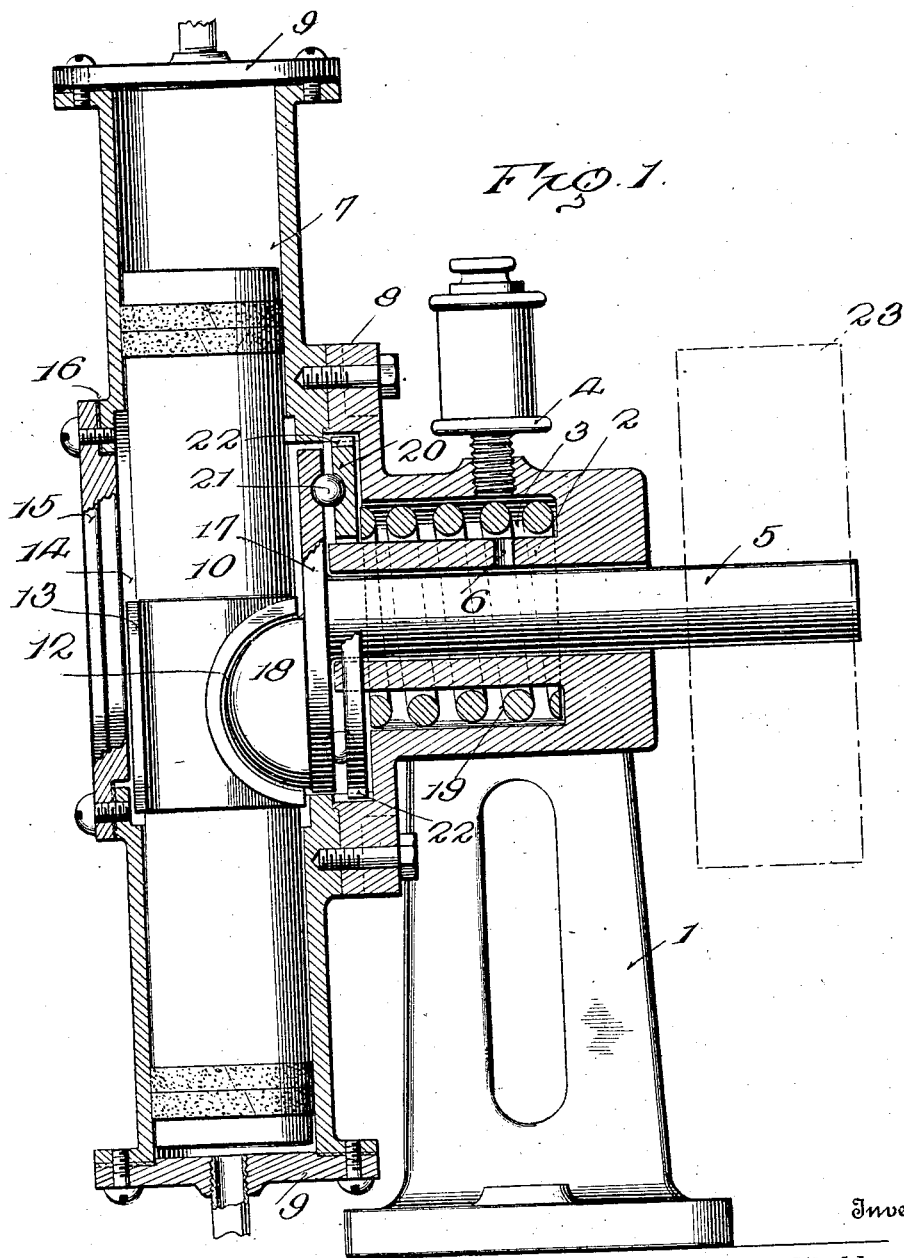

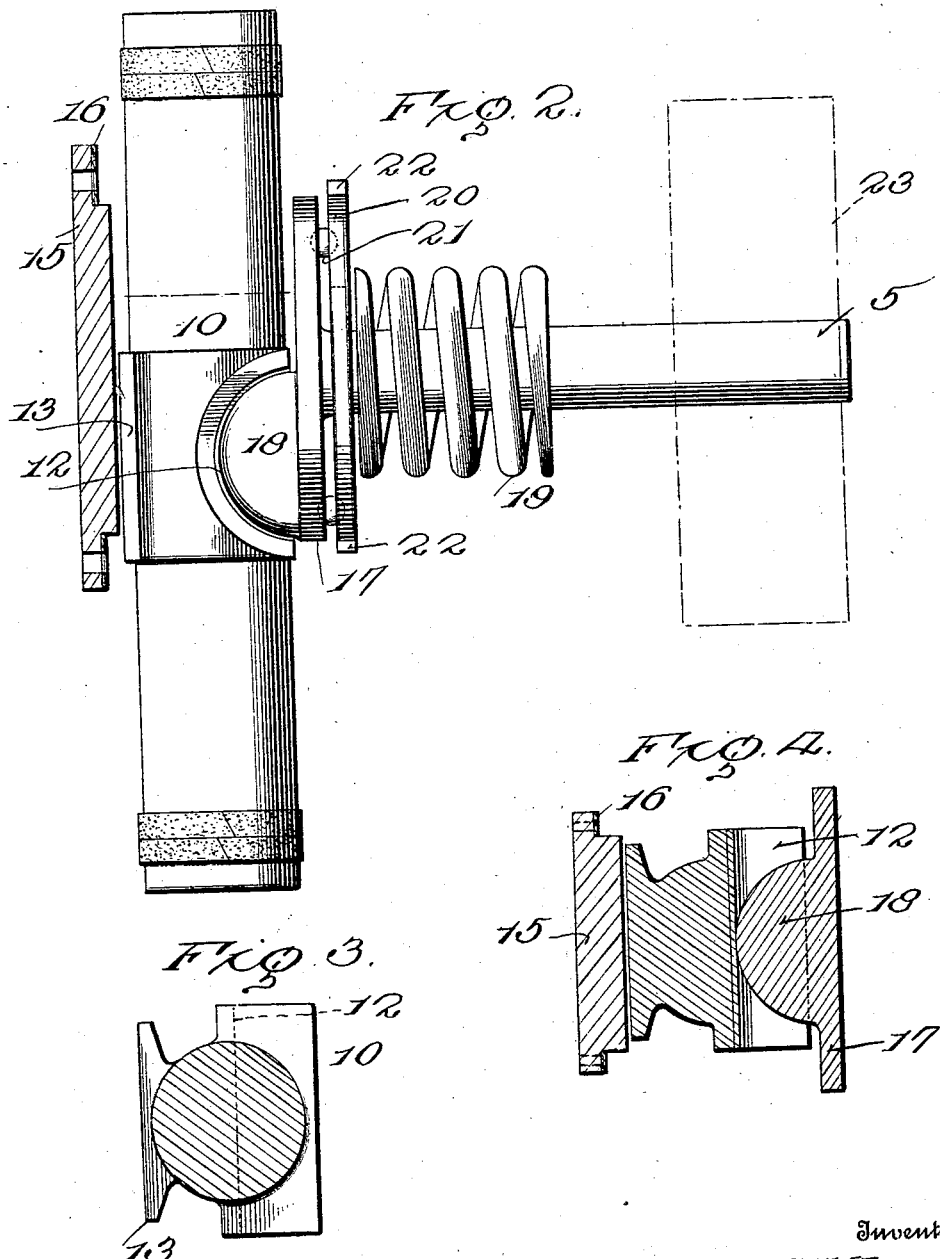

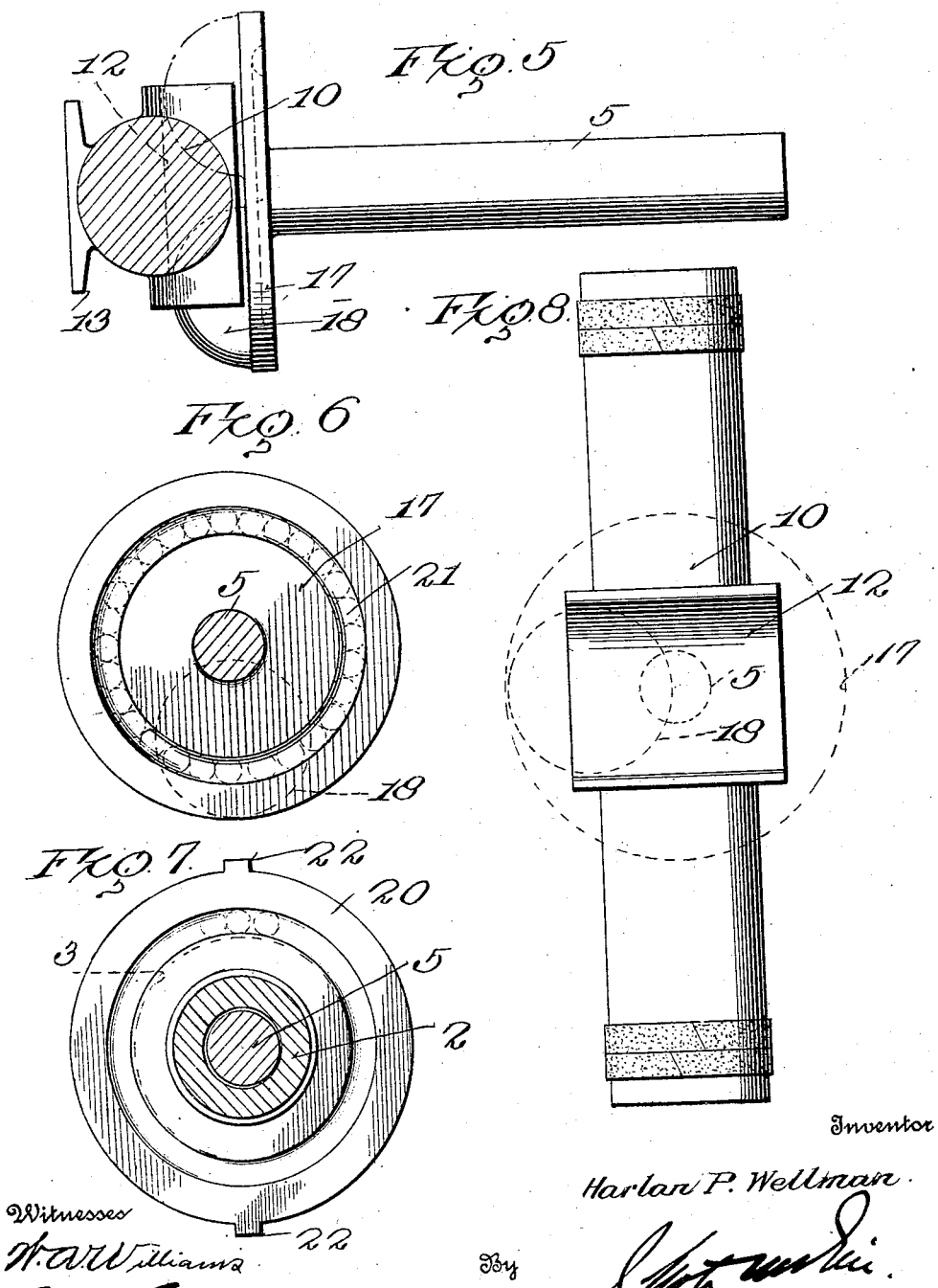

HARLAN P. WELLMAN, OF ASHLAND, KENTUCKY.

CRANK AND YOKE CONNECTION.

968,437.

Specification of Letters Patent. Patented Aug. 23, 1910.

Application filed December 14, 1909. Serial No. 532,990.

*To all whom it may concern:*

Be it known that I, HARLAN P. WELLMAN, of Ashland, in the county of Boyd and State of Kentucky, have invented certain new and useful Improvements in Crank and Yoke Connections; and I do hereby declare the following to be a full, clear, and exact description of the invention, such as will enable others skilled in the art to which it appertains to make and use the same.

The primary object of this invention is to provide simple and highly efficient means for connecting a crank-shaft to the yoke of a double piston, which latter may be utilized either as a pump for compressing fluid, such as air, or as an engine acting under the expansive power of steam or the internal explosion of natural gas or gasolene.

A further object is to automatically compensate for wear and to reduce the possibility of wear to a minimum; and still further objects are to employ the smallest possible number of moving parts; to enable access to be readily and easily obtained; to insure efficient lubrication; and to guard against unnecessary friction.

The invention will be hereinafter fully set forth and particularly pointed out in the claims.

In the accompanying drawings, Figure 1 is a vertical longitudinal sectional view. Fig. 2 is a view of the pistons, crank shaft and adjacent parts removed from the casing. Fig. 3 is a cross sectional view through the yoke which connects the pistons. Fig. 4 is a similar view showing the crank disk and the bearing plate for the yoke. Fig. 5 shows the crank shaft and the yoke, a second position of the knuckle being indicated in dotted lines. Fig. 6 is a face view of the crank disk, the knuckle being indicated in dotted lines. Fig. 7 is a face view of the spring-pressed disk. Fig. 8 is an elevation of the yoke and pistons with parts in dotted lines.

Referring to the drawings, 1 designates a supporting standard which is formed with a tubular portion 2 which is surrounded by a space 3 into which opens a lubricating cup 4. Within the tubular portion 2 is mounted a shaft 5 to which lubrication is supplied through a port 6 in the shaft bearing.

7 is a cylindrical casing which is removably bolted to flanges 8 of standard 1. The upper and lower ends of this casing are closed by cylinder heads 9 which are formed with central openings wherein valves (not shown) of any suitable type may be located when the apparatus is to be used as a fluid pump, or into which pipes may be secured when it is to be used as an engine. Within the casing is located a double reciprocating piston 10 composed of two cylindrical piston bodies which are connected by a yoke having on one side a concaved transverse recess 12 and on its opposite side a wing 13 which fits into a guide 14 and against the inner face of a bearing plate 15. This plate is detachably secured to the casing, between which and said plate I preferably locate a series of thin disks 16 the number of which may be increased or diminished by removing the plate to compensate for wear.

The shaft 5 at its inner end has a disk 17 upon which is eccentrically located a hemispheroidal knuckle 18 which fits into the concaved recess 12. To prevent excessive wear between this knuckle and the face of the recess these parts are preferably casehardened.

Within the space 3 is located a spiral spring 19 which surrounds the shaft bearing and bears against a circular disk 20 of approximately the same diameter as disk 17, and between these two disks are steel ball bearings 21 which fit in raceways in the opposed faces of the two disks. The disk 20 is held from rotating but is free to move longitudinally of the shaft bearing. For this purpose I preferably provide the disk 20, at opposite points, with lugs 22 which by projecting into corresponding grooves in the flanged portion of standard 1 form keys which permit the disk to be moved longitudinally of the shaft under the action of the spring but hold it from turning axially.

I have indicated in dotted lines, Fig. 1, a belt pulley 23 on shaft 5, but any suitable means may be employed for imparting power to or taking it from this shaft.

In operation, the rotation of crank shaft 5, acting through disk 17 and knuckle 18, effects the reciprocation of the double piston, the knuckle sliding back and forth in the transverse recess of the yoke which connects the pistons. If pressure is applied to the pistons they effect the rotation of the shaft. The spring 19 by bearing against disk 20 and the latter acting on disk 17 will hold the knuckle 18 in contact with the recess in the yoke. The contact between wing 13 and guide 14 insures the reciprocation of the double piston on straight lines. As wear occurs the number of disks 16 may be lessened by simply removing and replacing plate 15. Of course, I may also compensate for wear by adjusting the retaining screws of plate 15. Oil being supplied to the space 3 surrounding the shaft bearing will readily find its way into the cylinder casing and thus provide ample lubrication for the reciprocating as well as the rotary parts.

The advantages of my invention will be apparent to those skilled in the art. The spring 19 acting constantly on disk 20 serves to retain the parts in perfect contact, and the knuckle 18 in the revolution of shaft 5 is always presenting a new surface to the transverse recess 12 by engagement with which the reciprocation of the yoke and pistons is effected.

While I have described the preferred manner of carrying out my invention, yet I do not restrict myself to the exact arrangement of parts, since changes may be made therein without departing from the spirit of the invention.

I claim as my invention:—

1. A crank and yoke connection comprising a yoke having a transverse concaved recess on one side and a guide wing on the other, an adjustable bearing for said wing, and a crank-shaft having a hemi-spheroidal knuckle fitting in said recess.

2. A crank and yoke connection comprising a yoke having a transverse concaved recess, a rotary shaft having a disk provided with an eccentrically-located knuckle fitted in said recess, and a spring acting on said shaft to hold said knuckle against the face of said recess.

3. A crank and yoke connection comprising a yoke having a transverse concaved recess, a rotary shaft having a disk provided with an eccentrically-located knuckle fitted in said recess, a second disk paralleling the first mentioned disk, ball-bearings between the two disks, and a spring serving to hold said knuckle against the face of said recess.

4. A crank and yoke connection comprising a yoke having a transverse concaved recess, a rotary shaft having a disk provided with an eccentrically-located knuckle fitted in said recess, a second disk paralleling the first mentioned disk, said second disk being held as against rotation but capable of moving longitudinally of the axis of the shaft, and a spring acting on said second disk to hold said knuckle against the face of said recess.

5. A crank and yoke connection comprising a standard having a shaft bearing and a space surrounding the latter, a yoke having a transverse concaved recess, a rotary shaft having a disk provided with an eccentrically-located knuckle fitted in said recess, a second disk adjacent to the first mentioned disk, means for holding the latter as against rotation, ball-bearings between the disks, and a spiral spring surrounding the shaft bearing and acting against said second disk.

In testimony whereof, I have signed this specification in the presence of two subscribing witnesses.

HARLAN P. WELLMAN.

Witnesses:
W. C. RICHARDSON,
R. O. FISHER.